United States Patent
Moisant-Thompson (10) Patent No.: US 9,772,502 B1
(45) Date of Patent: Sep. 26, 2017

(54) CREATING THREE-DIMENSIONAL AERIAL IMAGES

(71) Applicant: Intel Corporation, Santa Clara, CA (US)

(72) Inventor: Jonathan C. Moisant-Thompson, Santa Clara, CA (US)

(73) Assignee: Intel Corporation, Santa Monica, CA (US)

( * ) Notice: Subject to any disclaimer, the term of this patent is extended or adjusted under 35 U.S.C. 154(b) by 0 days.

(21) Appl. No.: 15/073,140

(22) Filed: Mar. 17, 2016

(51) Int. Cl.
| | |
|---|---|
| G03B 21/62 | (2014.01) |
| G02B 27/22 | (2006.01) |
| G02B 5/124 | (2006.01) |
| G02B 26/08 | (2006.01) |
| B29C 51/10 | (2006.01) |
| B29L 31/34 | (2006.01) |

(52) U.S. Cl.
CPC .......... G02B 27/2292 (2013.01); G02B 5/124 (2013.01); G02B 26/08 (2013.01); G03B 21/62 (2013.01); B29C 51/10 (2013.01); B29L 2031/3475 (2013.01)

(58) Field of Classification Search
CPC ........ G03B 21/26; G03B 21/28; G03B 21/62; G03B 35/00; G03B 35/18; G03B 35/24; H04N 9/67; H04N 9/3161; H04N 9/3155; H04N 9/3158
See application file for complete search history.

(56) References Cited

U.S. PATENT DOCUMENTS

| | | | | |
|---|---|---|---|---|
| 5,854,613 | A * | 12/1998 | Soltan ................ | G02B 27/2285 345/32 |
| 2003/0086167 | A1* | 5/2003 | Sonehara ........... | G02B 27/2214 359/471 |
| 2009/0005961 | A1* | 1/2009 | Grabowski .......... | G01C 21/365 701/532 |
| 2010/0118126 | A1* | 5/2010 | Park ................... | G02B 27/2285 348/51 |
| 2010/0214394 | A1* | 8/2010 | Maekawa .......... | G02B 27/2292 348/51 |

OTHER PUBLICATIONS

Langhans, K., et al., "FELIX 3D Display: an Interactive Tool for Volumetric Imaging," IS&T/SPIE's 14th International Symposium at Photonics West 2002 on "Electronic Imaging: Science and Technology" Jan. 20-25, 2002, San Jose CA., (15 pages).
Soltan, P., et al., "Laser Based 3D Volumetric Display System," SPIE, Feb. 9-14, 1992, San Jose, CA (16 pages).

* cited by examiner

*Primary Examiner* — Sultan Chowdhury
(74) *Attorney, Agent, or Firm* — Trop Pruner & Hu, P.C.

(57) ABSTRACT

A display for a computer system may be created by generating a three-dimensional image using a rotating helicoid. The helicoid may be formed by deforming a catenoid to form a helicoid. The helicoid may be supported by a pair of structures that do not occlude an image projected onto the helicoid nor occlude the user's ability to view the full extent of the image on the helicoid. The helicoid generated image may be transformed to an aerial floating image by a corner cube reflector array plate. Then depth sensing cameras may sense user interaction with the floating aerial image and may modify the image to make it appear that the user is actually modifying a physical object by manual manipulation.

22 Claims, 10 Drawing Sheets

CREATING THREE-DIMENSIONAL AERIAL IMAGES

BACKGROUND

This relates generally to three-dimensional (3D) aerial images.

Three-dimensional aerial images are 3D images that appear to float in space. The user can interact and can even manipulate such images. The user can also put his hand through the image.

There are a variety of uses of 3D aerial displays including entertainment, hands-free control, and the enhanced ability to view and manipulate 3D models.

One technique for generating 3D aerial displays is to use a swept volume technique. In swept volume displays, a moving surface acts as a display screen for a scanning laser or a projection system.

One swept volume display technique is a rotating helicoid. An image may be projected onto the axis of a rotating helicoid and that image can be viewed on the surface of the helicoid in a direction transverse to the axis of rotation of the helicoid. However, high volume manufacturing of helicoid shapes is a daunting prospect because it is very difficult to manufacture such a shape other than by manual techniques. Because of the complexity of the shape, conventional molding techniques do not work.

Another issue with helicoid swept volume displays is that the projected image gets shadowed by the central axis of the display. Therefore blank spots appear in the display itself.

BRIEF DESCRIPTION OF THE DRAWINGS

Some embodiments are described with respect to the following figures.

DETAILED DESCRIPTION

A display for a computer system may be created by generating a three-dimensional image using a rotating helicoid. The helicoid may be formed by deforming a catenoid to form a helicoid. The helicoid may be supported by a pair of structures that do not occlude an image projected onto the helicoid nor occlude the user's ability to view the full extent of the image on the helicoid. The helicoid generated image may be transformed to an aerial floating image by a corner cube reflector array plate. Then depth sensing cameras may sense user interaction with the floating aerial image and may modify the image to make it appear that the user is actually modifying a physical object by manual manipulation.

Figure 1:
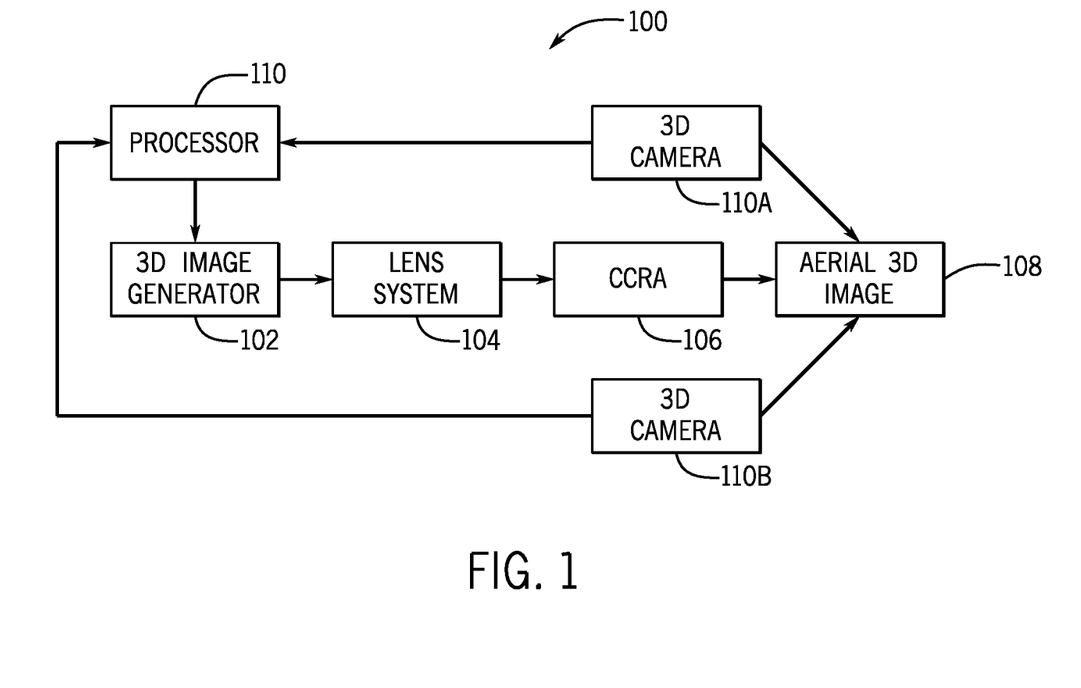
FIG. 1 is a system depiction for one embodiment.

Referring to FIG. 1, an aerial display system 100 may produce a 3D aerial image that appears to float in mid-air.

A 3D image generator 102 may generate a 3D image in one embodiment within the interior of housing. The mechanism for producing the image is concealed by the housing in some embodiments. The 3D image may be produced by any available 3D display including a swept volume display. A swept volume display is a display that has a moving display screen, on which an image is projected, by a laser beam or a conventional projector. Due to the movement of the display screen, the image that is produced is a 3D image.

The 3D image generator 102 may produce an image that is then magnified or enlarged by a lens system 104. In one embodiment, the lens system may be a Fresnel or flat lens. Then the enlarged image is passed through a corner cube reflector array (CCRA) plate 106. The reflector array plate refocuses the image so that it appears to be floating on the side of the reflector array plate 106 opposite to the side where the image actually was generated by the generator 102. This causes the image 108 to appear to float in mid-air. However, in fact, the user is actually viewing the image that is inside the concealed housing where the image generator 102 resides.

The resulting aerial 3D image 108 may not itself be imaged by 3D depth cameras 110*a* and 110*b*. The cameras cannot see the floating image, but they can image the user's hands. The image is only viewable from a limited viewing window, which is where the user is assumed to be in or directed to position themselves within. These cameras are depth sensing cameras that can determine the location of the user with respect to the 3D aerial image 108. The cameras then provide feedback to enable the 3D aerial image to be manipulated or revised based on these images captured by the depth sensing cameras.

For example, if the 3D image is a model of a cube, the user can manipulate the cube so as to rotate it by turning the user's hands. The 3D cameras capture this user motion. The 3D image may be caused to appear to move, responsive to the user motion, by changing the image that is produced by the 3D image generator 102. This may be done by providing the 3D camera images to the processor 110 to be processed to produce a modification of the image that is projected onto the 3D image generator. The 3D image is modified so that the user thinks that the user is actually moving or modifying the 3D aerial image.

Figure 2:
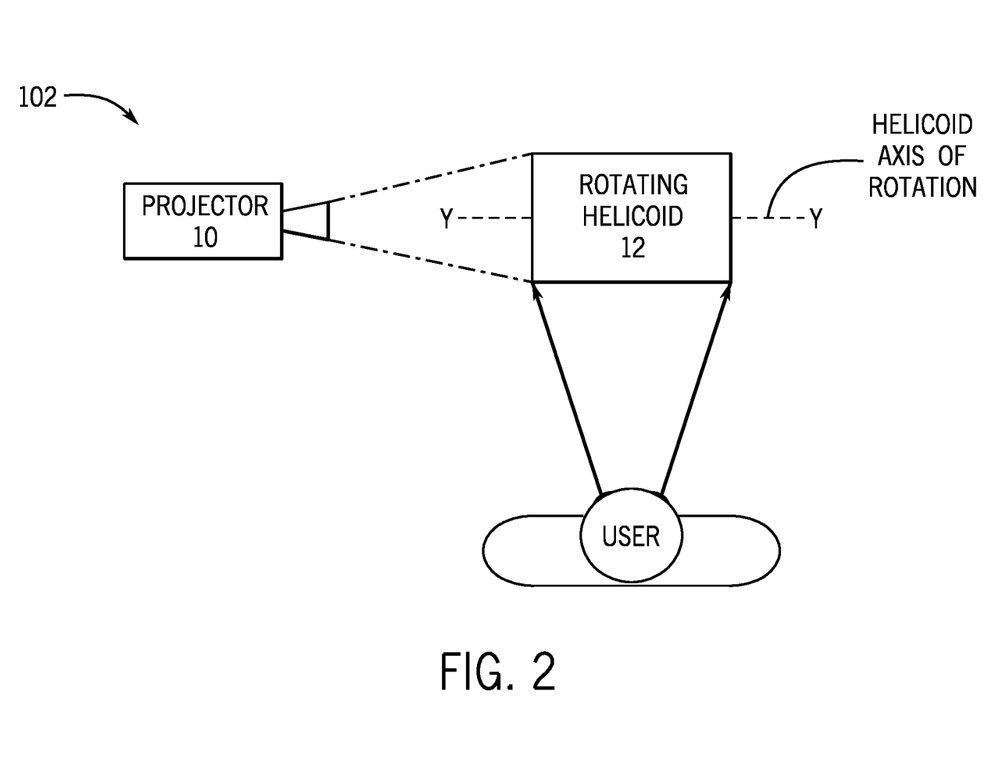
FIG. 2 is a schematic depiction of one embodiment of a 3D image generator.

Referring to FIG. 2, one embodiment of the image generator 102 produces a 3-D image using a rotating helicoid 12. A projector 10 projects an image onto the rotating helicoid 12. The projector 10 may be a laser projector such as a scanning laser beam or a conventional computer based planar image projector.

The helicoid 12 rotates around the helicoid axis of rotation Y-Y. The resulting 3D image displayed on the helicoid 12 is viewed in a direction transverse to the axis of rotation as indicated by the user's head shown in FIG. 2.

Figure 3:
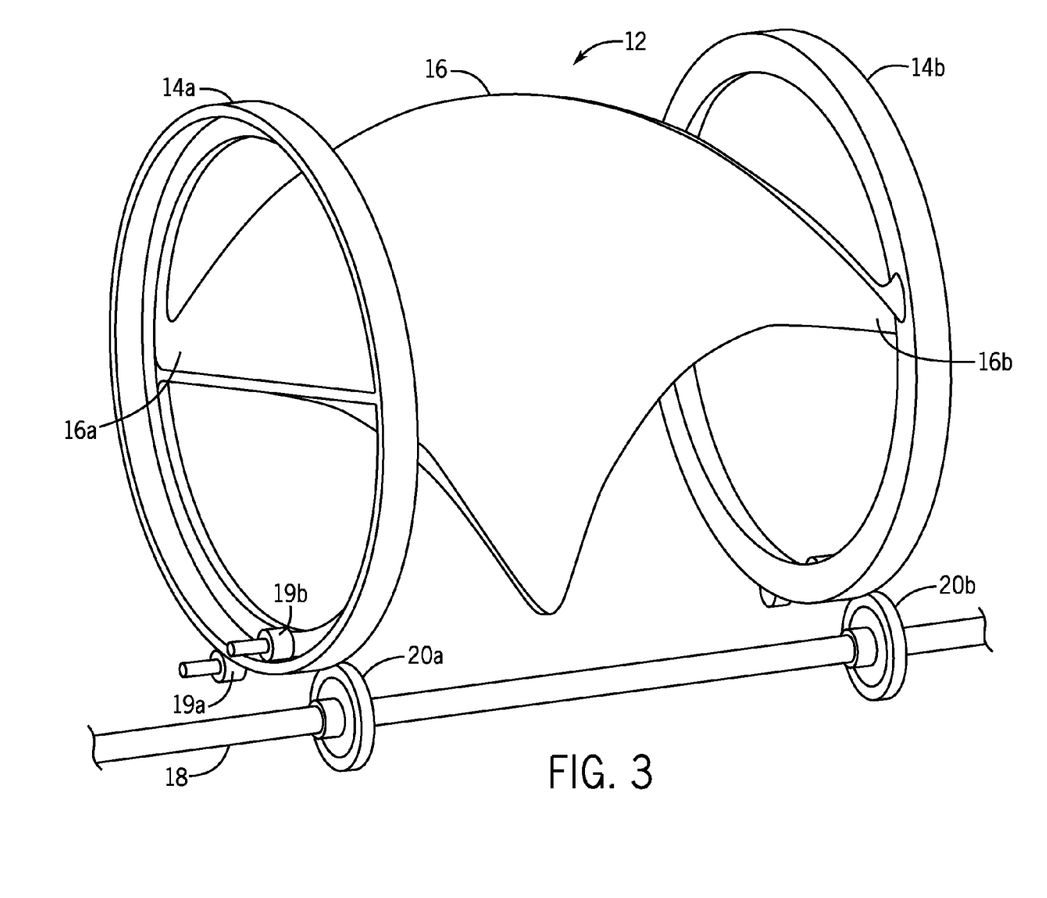
FIG. 3 is a perspective view of a helicoid display screen according to one embodiment.

FIG. 3 shows one embodiment for mounting a half revolution helicoid 16 for rotation without creating blank spots in the 3D image.

The traditional method to drive a helical display surface is to directly drive a central axle. That axle creates a "dead zone" upon which no imaging can appear, since its surface is perpendicular to the projection angle. The half revolution helicoid 16 is mounted at opposed corners 16a and 16b on a pair of rings 14a and 14b with their centers aligned with the axis of rotation of the helicoid 16. Each ring 14a or 14b has a diameter that is greater than the diameter of a helicoid 16 so that when an image is projected on the helicoid, the rings do not obstruct the projected image.

Similarly, the rings are spaced, along the axis of a helicoid, outbound of the helicoid itself so that, from a direction transverse to the axis of rotation, there is no occlusion of the image displayed on the helicoid 16.

The helicoid may be rotated about its central axis of rotation using an axle 18 with a pair of drive wheels 20a and 20b which frictionally engage each ring 14a or 14b, driving those rings to rotate and in turn rotate the helicoid 16 at a sufficient speed. Generally a sufficient speed is in the range of ten revolutions per second which is sufficient to project a reasonably distinct image that the user sees in 3D.

In some embodiments a pair of rollers 19a and 19b may be used to control the movement of the helicoid 16 and to ensure that the rings are pressed against the rollers 20a and 20b.

Figure 4:
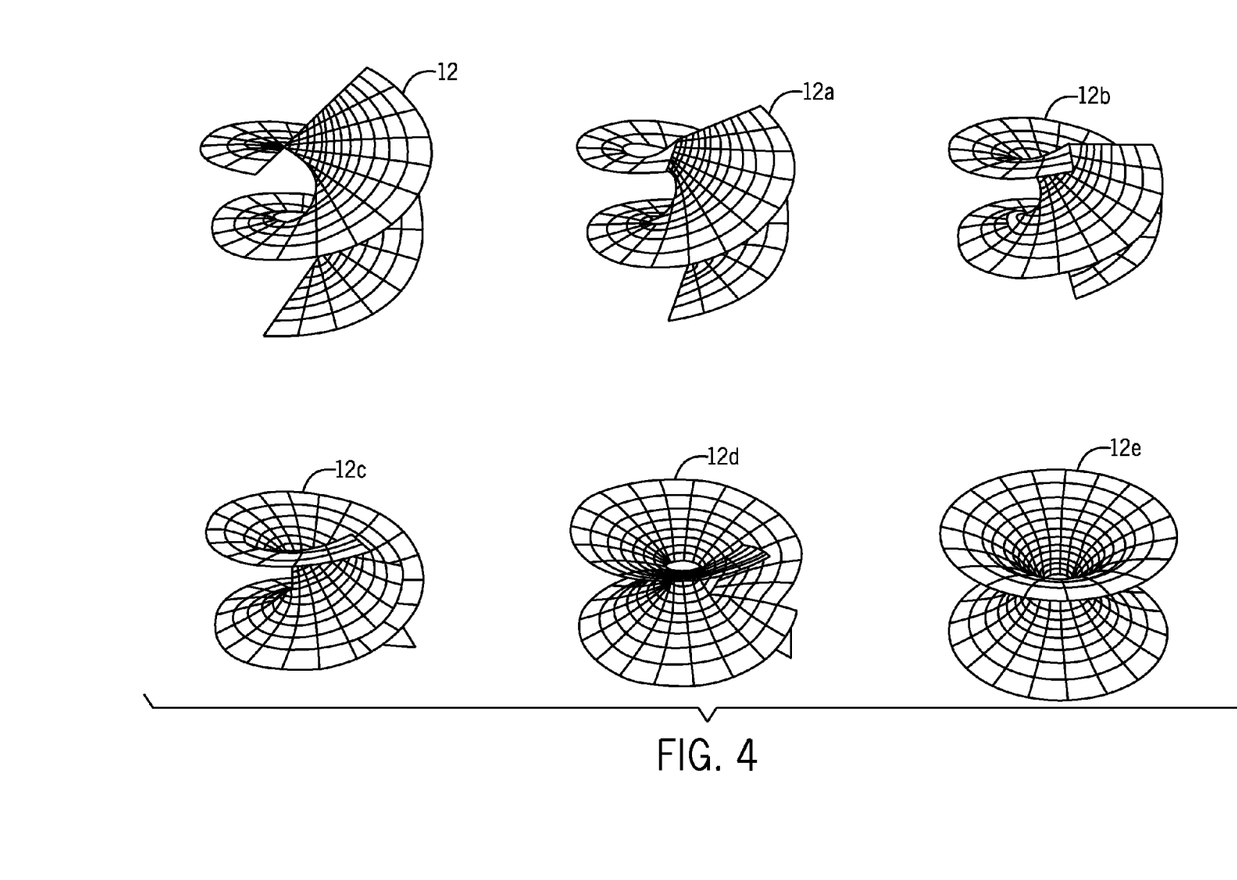
FIG. 4 is a front elevational view of the transformation of a helicoid to a catenoid or vice versa according to one embodiment.

In accordance with one embodiment, the helicoid may be formed from a catenoid or in some cases, a half revolution helicoid may be formed from a half catenoid. Due to their unique family of surfaces, these two shapes can be warped back and forth between stable configurations without bending, folding, or stretching. As shown in FIG. 4, a helicoid 12 transforms progressively as shown at 12a, 12b, 12c and 12d to the catenoid 12e.

A half catenoid, which is half of the catenoid shown in 12e, may be flexed to form a half revolution helicoid. Specifically, if the catenoid is made of flexible material, it may be flexed between two stable states, one of which is a catenoid shape and the other which is a helicoid shape.

Figure 5:
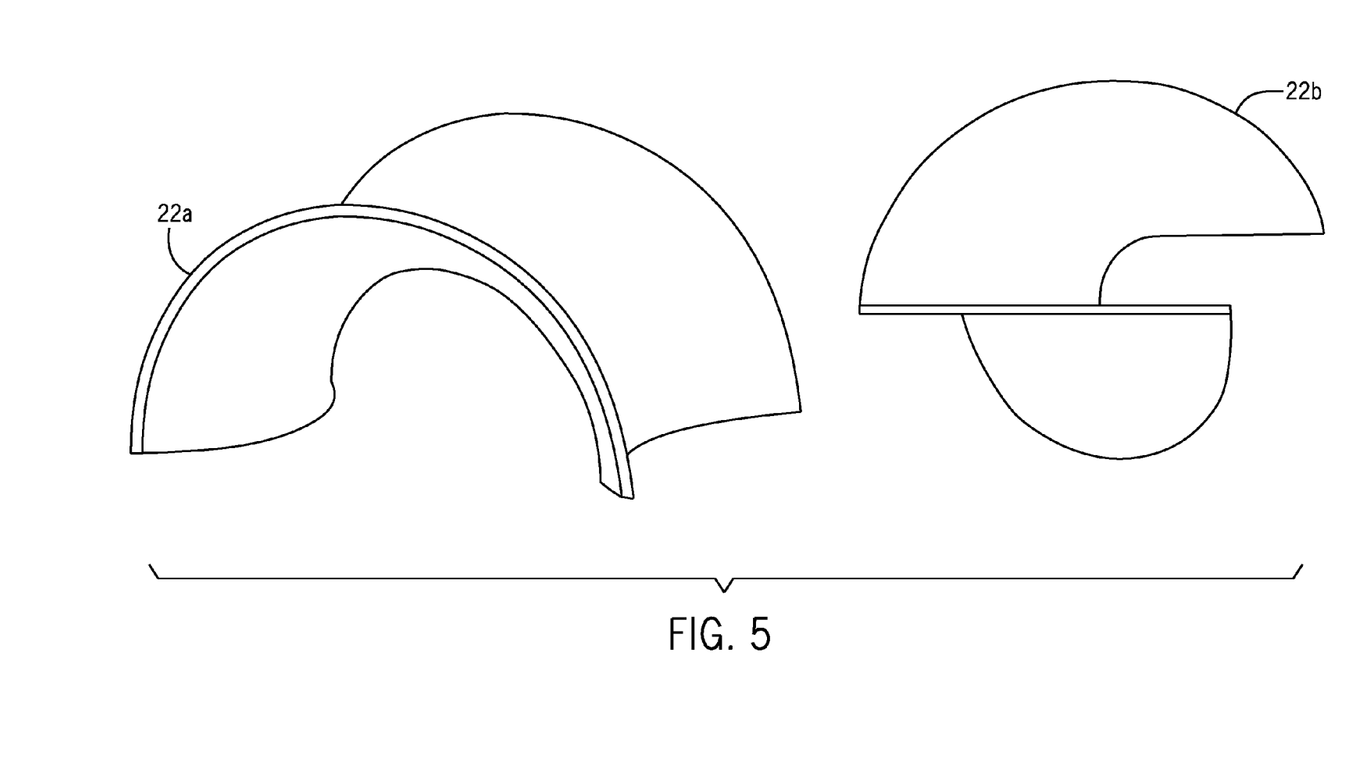
FIG. 5 is a perspective view of a half catenoid on the left that may be deformed to produce a half helicoid on the right according to one embodiment.

Thus shown in FIG. 5, a half catenoid 22a on the left may be flexed to form a half revolution helicoid 22b if the half catenoid is made of sufficiently flexible material. Once flexed, the helicoid 22b retains its helicoid shape until energy is again applied.

Figure 6:
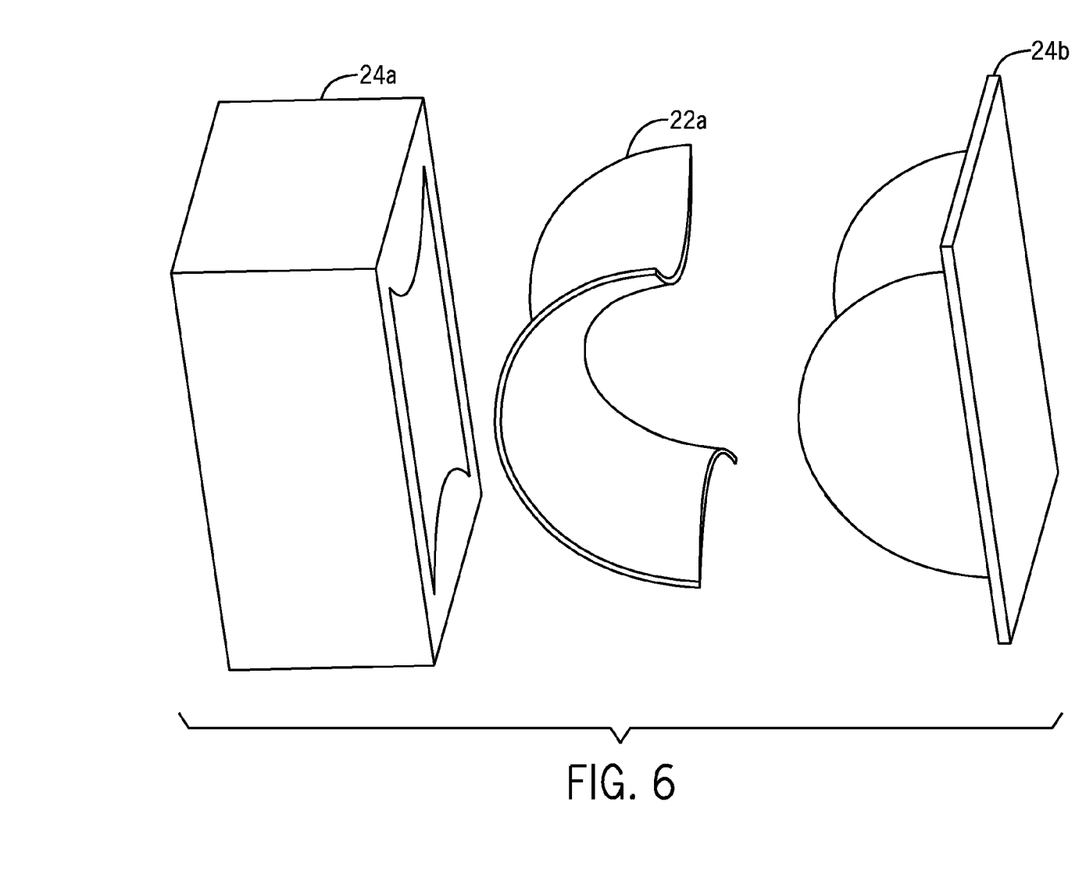
FIG. 6 shows in perspective view of a half helicoid being molded according to one embodiment.

As shown in FIG. 6, the half catenoid 22a may be molded in a simple two piece mold including mating halves 24a and 24b. Thereafter, the half catenoid 22a is simply flexed to form the half revolution helicoid 22b (FIG. 5).

Figure 7A:
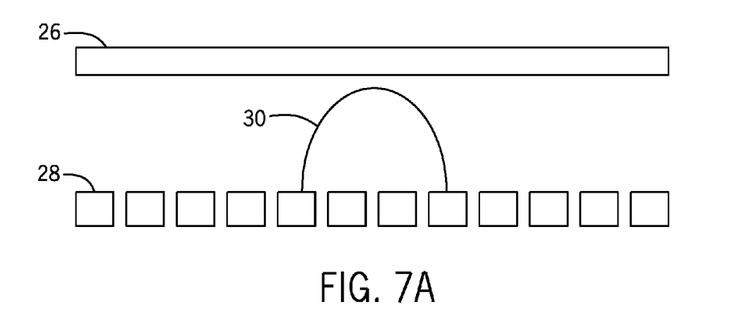
FIG. 7A-7C are schematic depictions of a vacuum forming technique for molding a helicoid or catenoid shape in accordance with one embodiment.
Figure 7B:
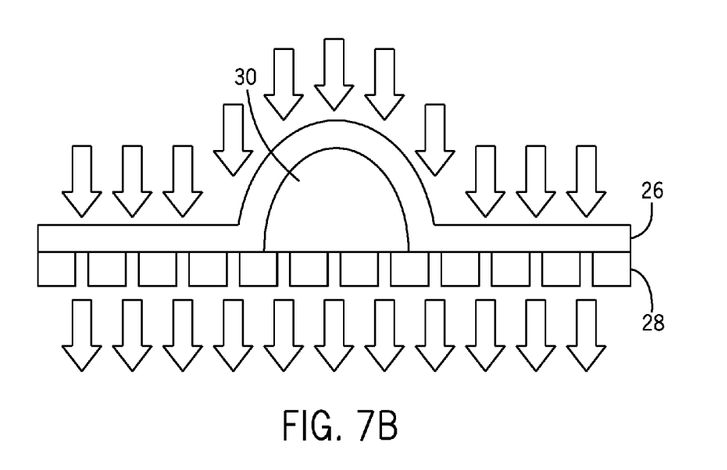
Figure 7C:
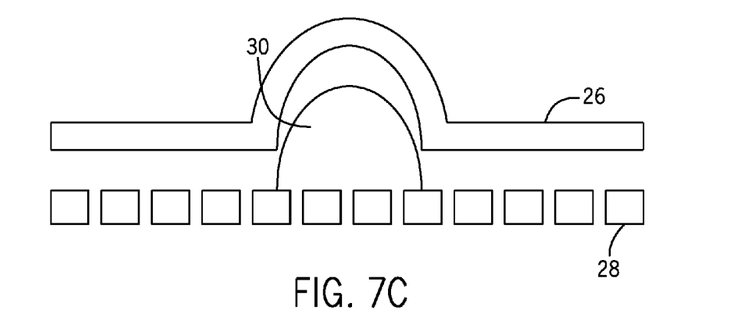

In accordance with another embodiment, vacuum forming may be used with a mold 30 in a half catenoid shape. The half catenoid shaped mold 30 may be covered by a sheet of thermoplastic 26 as shown in FIG. 7A. A vacuum (indicated by arrows) is drawn through the aperture plate 28, causing the thermoplastic sheet, when heated and subjected to reduced pressure, to conform to the half catenoid shaped mold 30, as shown in FIG. 7B, when air is sucked out of the vacuum forming chamber. This results in the half catenoid molded plastic sheet 26 shown in FIG. 7C. The resulting product may be completed by trimming away unneeded material and flexing to form a half revolution helicoid.

Figure 8:
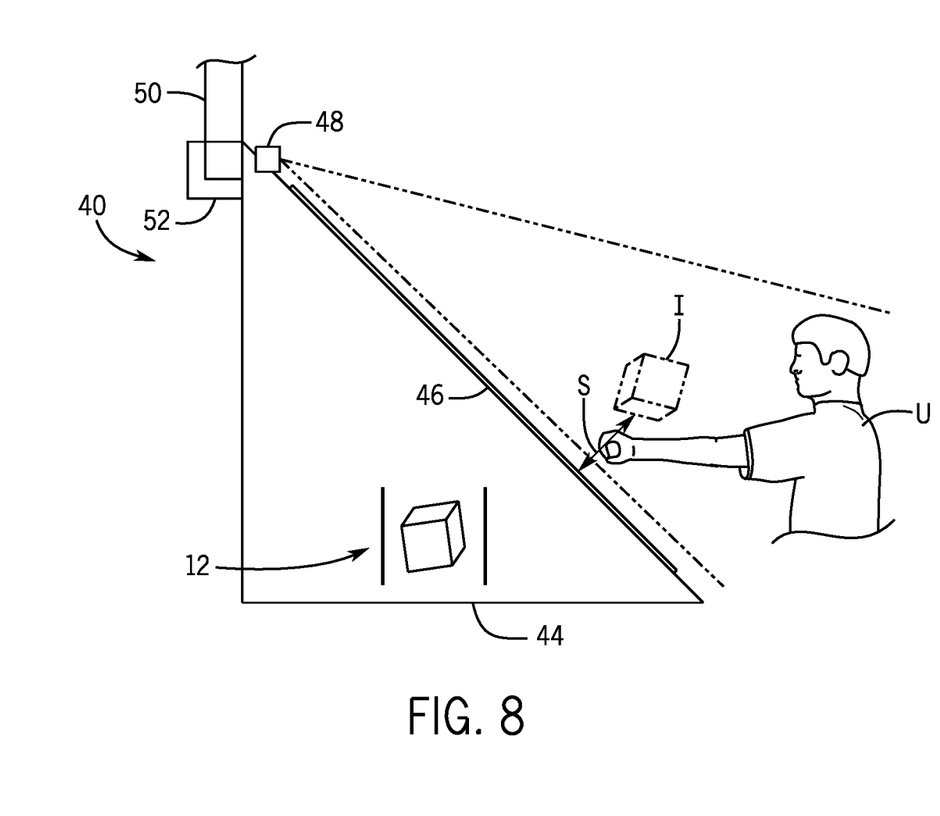
FIG. 8 is a cross-section of a volumetric display in accordance with one embodiment.

In some embodiments, the rotating helicoid (manufactured as described herein), can be formed within an interior chamber of a computer so that the helicoid rotation mechanism itself is not visible. For example, as shown in FIG. 8, the computer 40 may include a triangularly shaped housing 44 in which is the half helicoid 12 (shown in FIG. 3) is rotated. When the helicoid 16 is rotated within the housing, it appears, as indicated at I, as a floating 3D aerial image I. This is visible by the user U.

The transformation from the interior 3D image to the exterior floating 3D image is a result of the use of a corner cube reflector array plate 46. The corner cube reflector array plate causes the image within the housing 44, formed by the rotating helicoid, to appear to float at a location as indicated at I, spaced away from the housing 44. This allows sufficient space S to enable the user U to physically interact with the image I.

Then the user can interact with the image I, for example by appearing to rotate or turn the image I. This user actuation, detected by 3D depth cameras 48, may be used to cause the image produced by the 3D aerial display to change as if the user is actually causing the image to respond to the user's action.

Image I could be an image of a joy stick, a driving wheel or any other user input device in some embodiments. It may even be a 3D model that the user can turn virtually to look at the different aspects or surfaces of that model. Again the user does this by simply manipulating (or appearing to manipulate) the aerial image and the actuations are detected by the depth sensing cameras 48, which can be used determine in three-dimensions the nature of the user's effect on the 3D aerial image.

Housing 44 may then be secured or otherwise associated with a computer 50 such as a tablet computer. While a tablet computer is indicated, other computing devices such as a laptop computer or the display of a desktop computer may be used as additional examples. In each case, the device 44 may be electrically coupled to the computer 50 to enable signals to be provided for example from the depth sensing cameras to the processor of the computer so that that processor may analyze those signals and provide signals to the projection system associated with the rotating helicoid to change the display to create the appearance that the user is actually modifying a virtual object floating in front of the user. In one embodiment, the user's interaction with the floating image may be used as a input device to provide inputs to the associated computer 50.

In some embodiments a suitable bracket 52 is used to electrically and mechanically coupled the computer 50 to the device 40. In some embodiments, the two devices 40 and 50 may be separable electrically and mechanically. In other embodiments, the two devices may be mechanically separate but electronically coupled either by wires or wireless signals.

Figure 9:
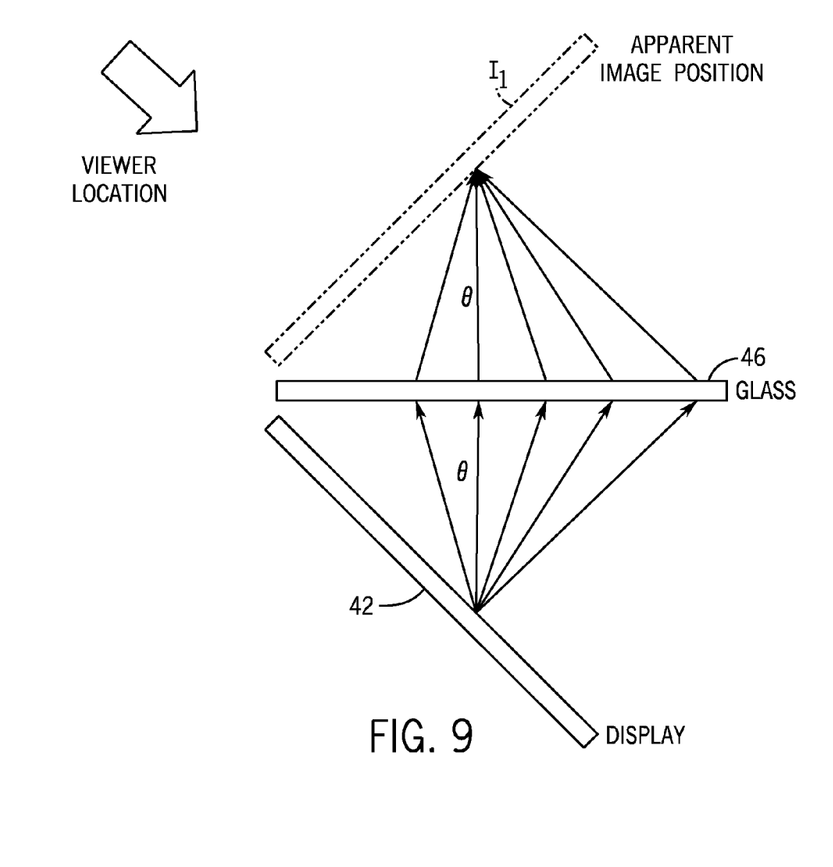
FIG. 9 is a schematic depiction of how a volumetric display with an aerial display glass according to one embodiment.

As shown in FIG. 9, the corner cube reflector array plate 46 can take a display 42 (which could for example correspond to a 3D aerial display inside a housing) and can refocus it to an apparent image position I as shown in FIG. 8. In one embodiment, the display plate 46 is an Asukanet aerial imaging plate available from Asukanet Co. Ltd of Hiroshima, Japan. Asukanet's U.S. patent application 2013/0194648 is hereby expressly incorporated by reference herein.

The Asukanet aerial imaging plate is advantageous in some embodiments because the volume of the content produced by the imaging plate and the volume captured by the 3D imaging cameras 110a and 110b (shown in FIG. 1) may be made to overlap or substantially coincide. This is due, at least in part, to the fact that the content produced by the aerial imaging plate appears to float at a sufficient distance away from the aerial imaging plate to enable user interaction with the content.

One issue with the aerial imaging plate is that if you put something on one side of the imaging plate, the resulting image on the other side ends up looking like it has the wrong curvature. Thus in some cases you need another imaging plate to correct the image. For example, a beer can on one side of the imaging plate looks like it is an inside out beer can on the other side of the imaging plate.

By digitally creating an inside out image projected onto the rotating helicoid, the resulting 3D image ends up being right side out after passing through the aerial imaging plate.

Figure 10:
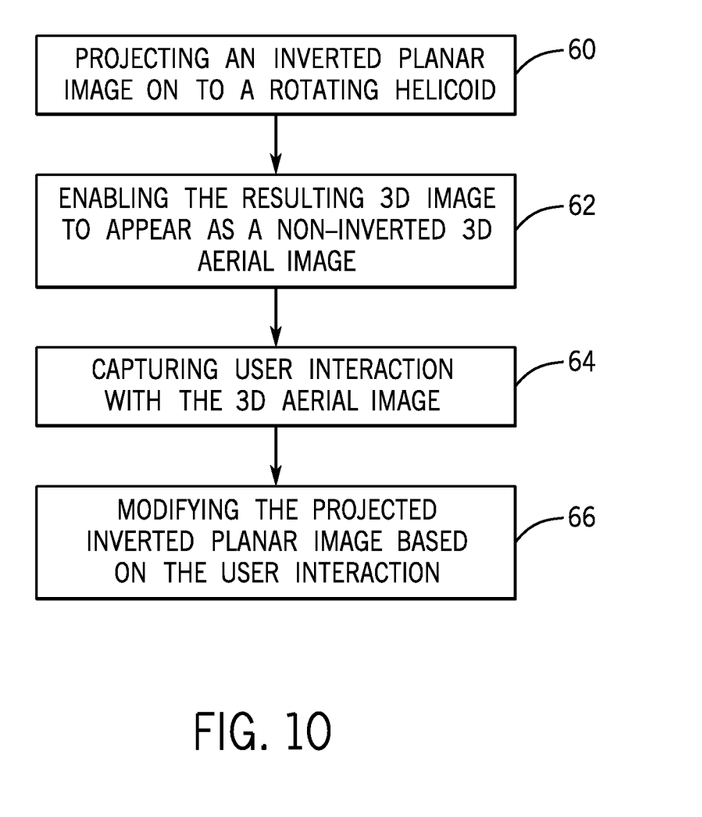
FIG. 10 is a flow chart for one embodiment.

Referring to FIG. 10, a sequence may be used to enable user interaction with a 3D aerial image. Initially, an inverted planar image is projected onto a rotating helicoid as indicated in block 60. In other embodiments, other swept volume displays may be used. Then the resulting 3D image is caused to appear as a non-inverted 3D aerial image as indicated in block 62 as a result of passing through (or being visible through) a corner cube reflector array. Then user interactions with the 3D aerial image may be captured as indicated in block 64 using depth sensing cameras. These depth sensing cameras may provide a signal to a processor which modifies the projected inverted planar image based on the user interaction to create the appearance that the user is in effect modifying the 3D aerial image.

The helicoid itself may be transparent, translucent or opaque. In the case of transparent or translucent helicoids, both forward and rear projection devices may be implemented with projection from either end. In the case of an opaque helicoid, two axially opposing projectors may each be visible from a different side of the helicoid. Thus in some cases, dual visibility can be achieved.

The following clauses and/or examples pertain to further embodiments:

One example embodiment may be a method comprising generating an inverted three-dimensional image, and producing a non-inverted three-dimensional aerial image using a corner cube reflector array. The method may include generating the inverted three-dimensional image using a rotating helicoid. The method may include generating the inverted three-dimensional image inside a computer housing.

Another example embodiment may be a method comprising forming a catenoid, flexing the catenoid to form a helicoid, and preventing the helicoid from deforming back to a catenoid. The method may include molding the catenoid. The method may include vacuum forming the catenoid In another example embodiment may be an apparatus comprising a helicoid display screen having an envelope, and a pair of opposed supports attached to opposite ends of said display screen outside of said envelope. The apparatus may include wherein said supports are rings, said rings connected to a rotating drive to rotate said helicoid. The apparatus may include wherein said supports have an inside perimeter greater than the outside perimeter of the helicoid display screen. The apparatus may include a computer. The apparatus may include a housing coupled to said computer to enclose said screen. The apparatus may include a corner cube reflector array mounted on said housing. The apparatus may include a projector to project an inverted two-dimensional image on said screen.

In still another example embodiment may be an apparatus comprising a device to generate an inverted three-dimensional image, and a corner cube reflector array to produce a non-inverted three-dimensional aerial image. The apparatus may include said device including a rotatable helicoid. The apparatus may include a computer having a housing. The apparatus may include said device to generate the inverted three-dimensional image inside the computer housing. The apparatus may include said helicoid having an envelope and a pair of opposed supports attached to opposite ends of said helicoid outside said envelope. The apparatus may include wherein said supports are rings, said rings connected to a rotating drive to rotate said helicoid. The apparatus may include wherein said supports have an inside perimeter greater than the outside perimeter of the helicoid display screen.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
generating an inverted three-dimensional image using a rotating helicoid; and
producing a non-inverted three-dimensional aerial image using a corner cube reflector array.

2. The method of claim 1 including generating the inverted three-dimensional image inside a computer housing.

3. A method comprising:
forming a catenoid;
flexing the catenoid to form a helicoid; and
preventing the helicoid from deforming back to a catenoid.

4. The method of claim 3 including molding the catenoid.

5. The method of claim 3 including vacuum forming the catenoid.

6. An apparatus comprising:
a helicoid display screen having an envelope; and
a pair of opposed supports attached to opposite ends of said display screen outside of said envelope.

7. The apparatus of claim 6 wherein said supports are rings, said rings connected to a rotating drive to rotate said helicoid.

8. The apparatus of claim 6 wherein said supports have an inside perimeter greater than the outside perimeter of the helicoid display screen.

9. The apparatus of claim 6 including a computer.

10. The apparatus of claim 9 including a housing coupled to said computer to enclose said screen.

11. The apparatus of claim 10 including a corner cube reflector array mounted on said housing.

12. The apparatus of claim 10 including a projector to project an inverted two-dimensional image on said screen.

13. An apparatus comprising: a rotatable helicoid to generate an inverted three-dimensional image; and a corner cube reflector array to produce a non-inverted three-dimensional aerial image.

14. The apparatus of claim 13 including a computer having a housing.

15. The apparatus of claim 13, said device to generate the inverted three-dimensional image inside the computer housing.

16. The apparatus of claim 13 said helicoid having an envelope and a pair of opposed supports attached to opposite ends of said helicoid outside said envelope.

17. The apparatus of claim 16 wherein said supports are rings, said rings connected to a rotating drive to rotate said helicoid.

18. The apparatus of claim 16 wherein said supports have an inside perimeter greater than the outside perimeter of the helicoid display screen.

19. A method comprising:
generating an inverted three-dimensional image inside a computer housing; and
producing a non-inverted three-dimensional aerial image using a corner cube reflector array.

20. The method of claim 19 including generating the inverted three-dimensional image using a rotating helicoid.

21. An apparatus comprising: a device to generate an inverted three-dimensional image within said housing; and a corner cube reflector array to produce a non-inverted three-dimensional aerial image.

22. The apparatus of claim 21, said device including a rotatable helicoid.

* * * * *